United States Patent [19]

Hidaka et al.

[11] Patent Number: 5,327,528

[45] Date of Patent: Jul. 5, 1994

[54] METHOD AND APPARATUS FOR CURSOR MOVEMENT CONTROL

[75] Inventors: Kazuyoshi Hidaka, Yokohama; Masanori Akaishi, Tokyo, both of Japan

[73] Assignee: International Business Machines Corporation, Armonk, N.Y.

[21] Appl. No.: 751,376

[22] Filed: Aug. 28, 1991

[30] Foreign Application Priority Data

Aug. 30, 1990 [JP] Japan ................................. 2-226812

[51] Int. Cl.⁵ ............................................. G06F 15/62
[52] U.S. Cl. ................................. 395/155; 395/133; 395/135; 395/161; 395/146
[58] Field of Search ............... 395/105, 133, 135, 138, 395/145, 146, 148, 155–161

[56] References Cited

U.S. PATENT DOCUMENTS

| 4,731,609 | 3/1988 | Reynolds et al. | 395/133 X |
| 4,742,473 | 5/1988 | Shugar et al. | 395/156 |
| 5,159,664 | 10/1992 | Yamamoto et al. | 395/133 |

FOREIGN PATENT DOCUMENTS 60-168227 8/1985 Japan.
62-242494 10/1987 Japan.

*Primary Examiner*—Heather R. Herndon
*Assistant Examiner*—Almis Jankus
*Attorney, Agent, or Firm*—Douglas H. Lefeve

[57] ABSTRACT

A method for moving a cursor while constrained on a selected, displayed graphics object displayed on a display screen. Entering a signal for pointing to a position on the display screen, determining a point on the display screen in response to the entered signal, determining a point on the graphics object which is near to the point determined on the display screen, and displaying a cursor at the point determined on the graphics object.

13 Claims, 19 Drawing Sheets

| NO. | TYPE | GEOMETRICAL DATA | ATTRIBUTE | SELECTION EFFECTIVE AREA |
|---|---|---|---|---|
| 1 | | | | |
| 2 | | | | |
| ... | | | | |
| I-1 | | | | |
| I | TYPE_i | GEO_DATA_i | ATTRIB_i | AREA_i |
| I+1 | | | | |
| ... | | | | |
| L | | | | |

FIG. 2  GRAPHICS OBJECT TABLE

SELECTION EFFECTIVE
AREA OF A SEGMENT

SELECTION EFFECTIVE
AREA OF A CIRCLE

OUTPUT COORDINATES

METHOD AND APPARATUS FOR CURSOR MOVEMENT CONTROL

BACKGROUND OF THE INVENTION

1. Field of the Invention

This invention relates to a method and an apparatus for moving a cursor while constrained on the contour of a graphics object in order to permit a point on the contour of the graphics object to be easily selected in a graphics processing system using a computer.

2. Description of Related Art

Processing of a graphics object displayed on a display screen is typically performed by moving a cursor. A user, while looking at the display screen, controls the movement of the cursor by giving instructions through a cursor key or by moving a pointing device such as a mouse. Moving and positioning the cursor on a specific point on the contour of the displayed graphics object involves a troublesome visual operation for the user. Moreover, this operation alone does not allow the user to select a point on the contour of the graphics object with geometrical precision; he or she can merely select a point that appears to his or her eyes to be nearest to the target graphics object.

In this connection, patent applications were submitted on the following two inventions, which aim to provide a precise and easy method of moving a cursor to a specific position on a graphics object, and descriptions of the inventions were published.

The invention disclosed in JA PUPA 60-168227 is first explained below. According to the invention, when a user wants to select a point P on the line E shown in FIG. 21, he first locates the cursor at an arbitrary point Q on the S-shaped curve E. This specifies the starting point for tracking. Next, the user specifies the direction in which tracking should start by moving the part for manipulation from point Q toward point P. The pixels forming the line figure are then sequentially tracked in the specified direction by a line tracking unit. This cursor movement control apparatus is provided with multiple predetermined masks for tracking pixels. The user can select one of the pixels being tracked. Tracking of pixels is continued until the user specifies that the process be terminated, that is, until a point on the line is selected.

This cursor movement control apparatus, however, involves the following problems:

(1) The user must specify a point and a direction to start tracking. Further, once the tracking has begun, the direction cannot be changed. In the example shown in FIG. 21, if the cursor has passed beyond the desired point P, the user must again specify the starting point and direction of tracking in order to move back the cursor. This is troublesome.

(2) As shown in FIG. 22A, segment N, which intersects segment M, cannot be tracked. More specifically, pixels are distributed as shown in FIG. 22B at the point of intersection of segments M and N, and this prior art apparatus cannot determine which of P2 and P3 should be selected as a subsequent pixel to P1. Even if it could do so, the apparatus might often fail to track segment N but and instead track the segment M. Line figures often include points of intersection or contact. In order to track such a line figure precisely, a method should be based on graphics objects, rather than on tracking pixels as in this device.

The next explanation is directed to the invention disclosed in JA PUPA 62-242494. In the method used with this cursor movement control apparatus, graphics objects are treated as functions, and a point at which tracking should start is predetermined for each graphics object. When a user specifies a graphics object, the cursor is moved to and displayed at the starting point of tracking on the graphics object. When the user specifies a tracking direction by means of a cursor key, the cursor starts moving in the specified direction. In the example shown in FIG. 23A, the starting point of tracking on a circle S is fixed at point P and, when the user instructs a rightward movement, the cursor C starts moving toward a terminal point Q in the direction indicated by an arrow.

This cursor movement control apparatus, however, involves the following problems:

(1) The user must specify a point and a direction to start tracking. Further, once the tracking has begun, the direction cannot be changed. In the example shown in FIG. 23A, if the cursor has passed beyond the desired point R, the user must return the cursor to the starting point of tracking P and specify the tracking direction. This is troublesome.

(2) Since the starting point of tracking is fixed, it takes much labor and time to move the cursor to a distant point such as R.

(3) In the example shown in FIG. 23B, the user first specified rightward movement: nevertheless the cursor C moves leftward near the point R on the display screen. This leads to a very bad operability.

(4) In this cursor movement control apparatus, the cursor can be moved along the contour of a graphics object only if it is representable as a function of F (x, y). Therefore, the apparatus cannot treat a free curve drawn by freely moving the mouse cursor on the display screen, as shown in FIG. 24.

The common features of the foregoing apparatuses configured to move a cursor along the contour of a graphics object are the need to specify a tracking direction every time the user starts tracking a graphics object with a cursor and the impossibility of changing the direction once the tracking has begun. Since a point on a graphics object is selected by trial and error in most cases, repeatedly specifying the manipulation for every change in the tracking direction is a burden on the user. In addition, tracking of a graphics object is performed automatically, and the user can specify only that the process be terminated. While cursor movements other than for tracking a graphics object are controlled through a pointing device or an equivalent, tracking of a graphics object alone is outside the direct control of the user; this lacks consistency and results in bad operability.

SUMMARY OF THE INVENTION

An object of the invention is therefore to make it possible to track graphics objects by means of a cursor without requiring the specification of points or directions prior to tracking.

A further object of the invention is to permit a user to directly control the movement of the cursor constrained onto the graphics object.

A method according to the invention for moving a cursor while constrained on a selected graphics object displayed on a display screen comprises the steps of:

(a) entering a signal for pointing to a position on the display screen;
(b) determining a point on the display screen in response to the signal entered in step (a);
(c) determining a point on the graphics object which is near to the point determined in step (b); and
(d) displaying a cursor at the point determined in step (c).

Steps (a) to (d) may be repeated until the user enters a signal indicating constraint release, such as an indication that a point on the graphics object has been selected.

In step (d), the cursor displayed heretofore may be deleted.

In step (d), positional information on the point determined in step (c) may be displayed.

The signal entered in step (a) may be a signal that indicates the direction and distance of motion of a pointing device.

When the graphics object is represented by a simple segment on the display screen, the point determined in step (c) may be a projection onto the graphics object of the point determined in step (b).

If the graphics object is a simple segment, points for dividing the segment by arbitrary ratios can readily be selected if information on the division of the segment by the point determined in step (c) is displayed in step (d).

If the graphics object is a simple segment, the segment may be virtually divided into n intervals (where n is an integer greater than 1) in response to the user's instructions, and the method may further include a step for determining representative points in the respective intervals. Such representative points may consist of the opposite ends of the simple segment and points that divide the segment into (n − 1) equal parts.

Further, the point determined in step (c) may be a representative point in the interval nearest to the point determined in step (b) among the n intervals, and the cursor may be displayed at the representative point in step (d). This makes it easy to select points that divide segments into equal portions.

When a selected graphics object is represented by a continuous series of segments such as a curve on a display screen, a method according to the invention for moving a cursor while constrained on the selected graphics object displayed on the display screen comprises the steps of:
(a) entering a signal for pointing to a position on the display screen;
(b) determining a segment $l_i$ from the continuous series of segments displayed on the display screen and a point $Q_i$ on the display screen, in response to the signal entered in step (a);
(c) determining a point $P_i$ that is a projection of said point $Q_i$ onto the segment $l_i$; and
(d) displaying a cursor at said point $P_i$.

Step (b) determines whether the point at which the cursor is displayed is an end of the segment or not; if so, segment $l_i$ may be selected from the segment including the point at which the cursor is currently displayed and the segment adjacent thereto, in response to the signal entered in step (a); otherwise, a segment including the point at which the cursor is currently displayed is determined to be segment $l_i$.

BRIEF DESCRIPTION OF THE DRAWING

FIG. 2 is an explanatory view of a graphics object table.

DESCRIPTION OF THE PREFERRED EMBODIMENTS

The invention is described below, with reference to the drawings.

Figure 1:
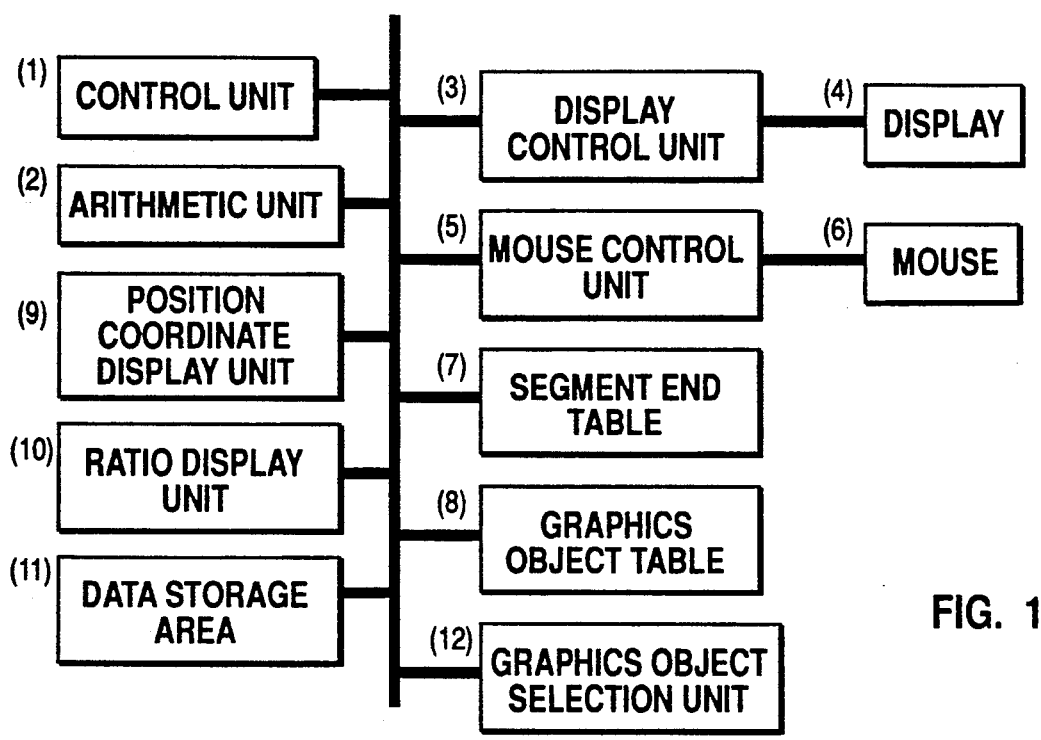
FIG. 1 is an explanatory view of the constituent components of a cursor movement control apparatus according to the invention.
Figure 3A:
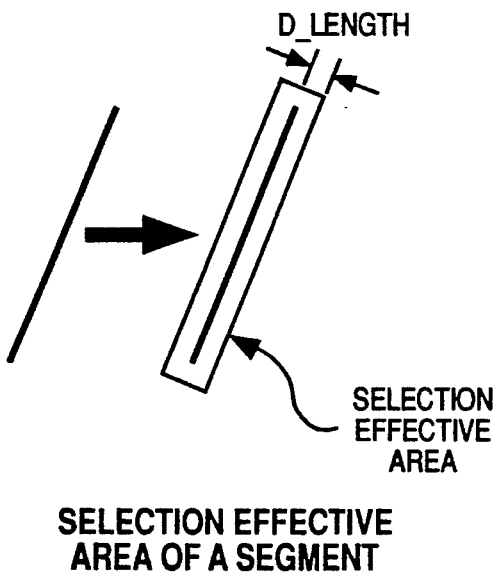
FIGS. 3A and 3B are explanatory views of the selection effective area of a graphics object.
Figure 3B:
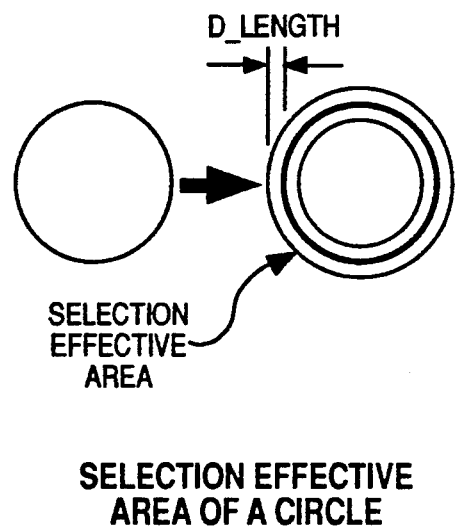
Figure 4:
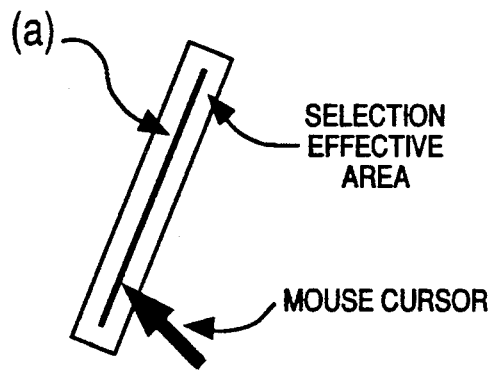
FIG. 4 is an explanatory view of a method for selecting a graphics object.

As shown in FIG. 1, the cursor movement control apparatus according to the invention includes a control unit 1, arithmetic unit 2, display control unit 3, display 4, mouse control unit 5, mouse 6, segment end table 7, graphics object table 8, position coordinate display unit 9, ratio display unit 10, data storage area 11, and graphics object selection unit 12. All the information on all graphics objects currently drawn on a display screen is stored in the graphics object table 8. The information includes the numbers of the graphics objects; types of graphics objects (segments, circles, points, etc.); geometrical data on graphics objects, including coordinate values, attributes such as types of lines or shapes of points; and selection effective areas, which are assorted and managed for each graphics object (see FIG. 2). For a line figure such as the one shown in FIGS. 3A and 3B, a length constant "D_LENGTH" is predetermined for each graphics object as the selection effective area. In this example, as shown in FIG. 4, a graphics object is selected by locating the mouse cursor in the selection effective area of a desired graphic object and clicking the button on the left. This method of selecting a graphics object is already known. For a graphics object that is defined to include the area enclosed by a line or lines, the interior is also regarded as part of the selection effective area.

Figure 5:
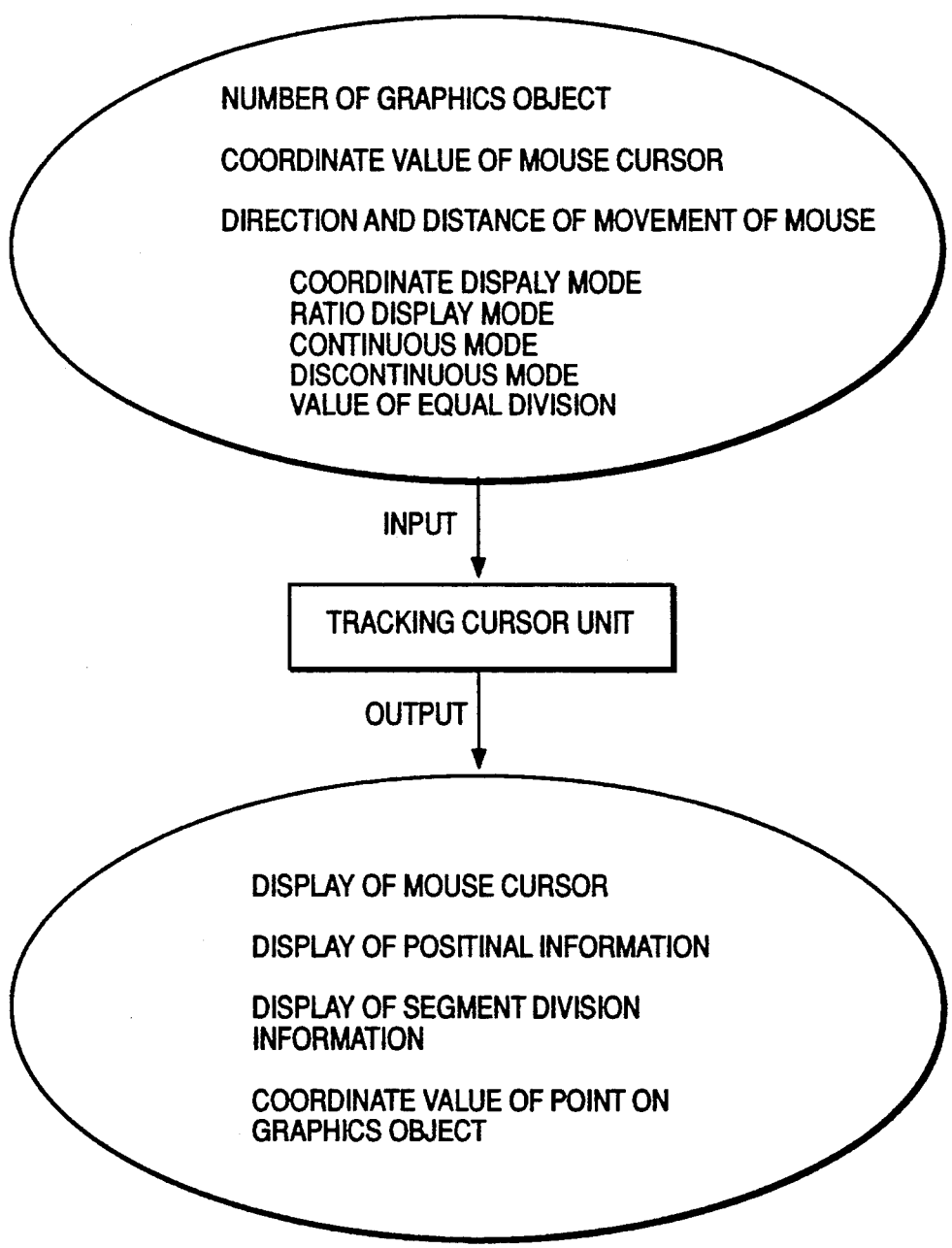
FIG. 5 is an explanatory view of the input data and output data of the apparatus of FIG. 1.

As shown in FIG. 5, the apparatus in FIG. 1 receives signals indicating the number of a graphics object, the operating mode (coordinate display, ratio display, continuous mode, discontinuous mode, and the value of equal division n in the case of the continuous mode), the current coordinate value of the mouse cursor, and the direction and distance of motion of the mouse. It then outputs the values of the coordinates of a finally designated point on the graphics object to, for example, the data storage area 11, while displaying the cursor according to a movement of the mouse and also displaying, in a certain mode, information on the cursor display position and on the segment division.

Figure 6:
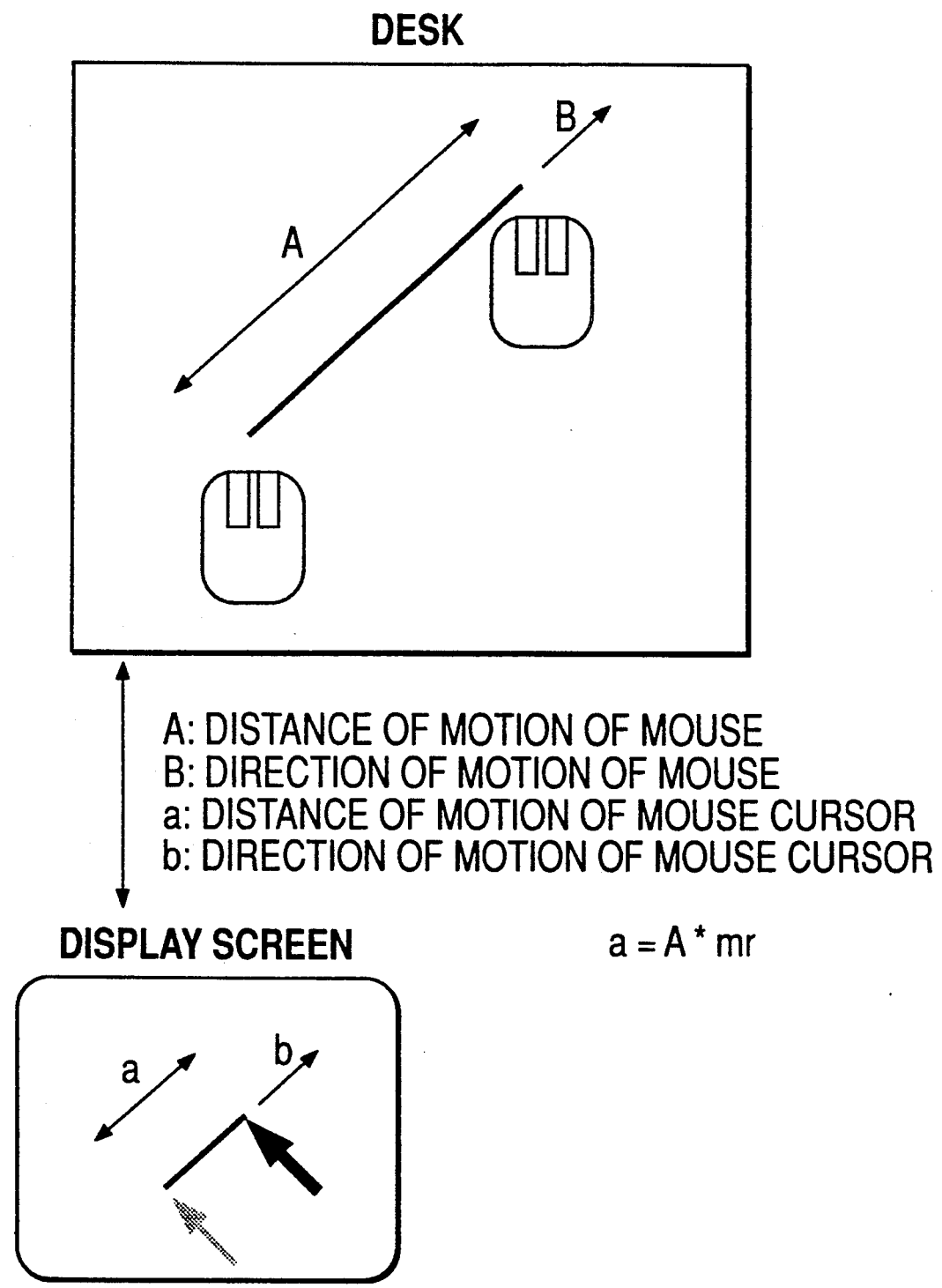
FIG. 6 is a view showing the relationship between a mouse movement on a desk and the position pointed to on a display screen.
Figure 7:
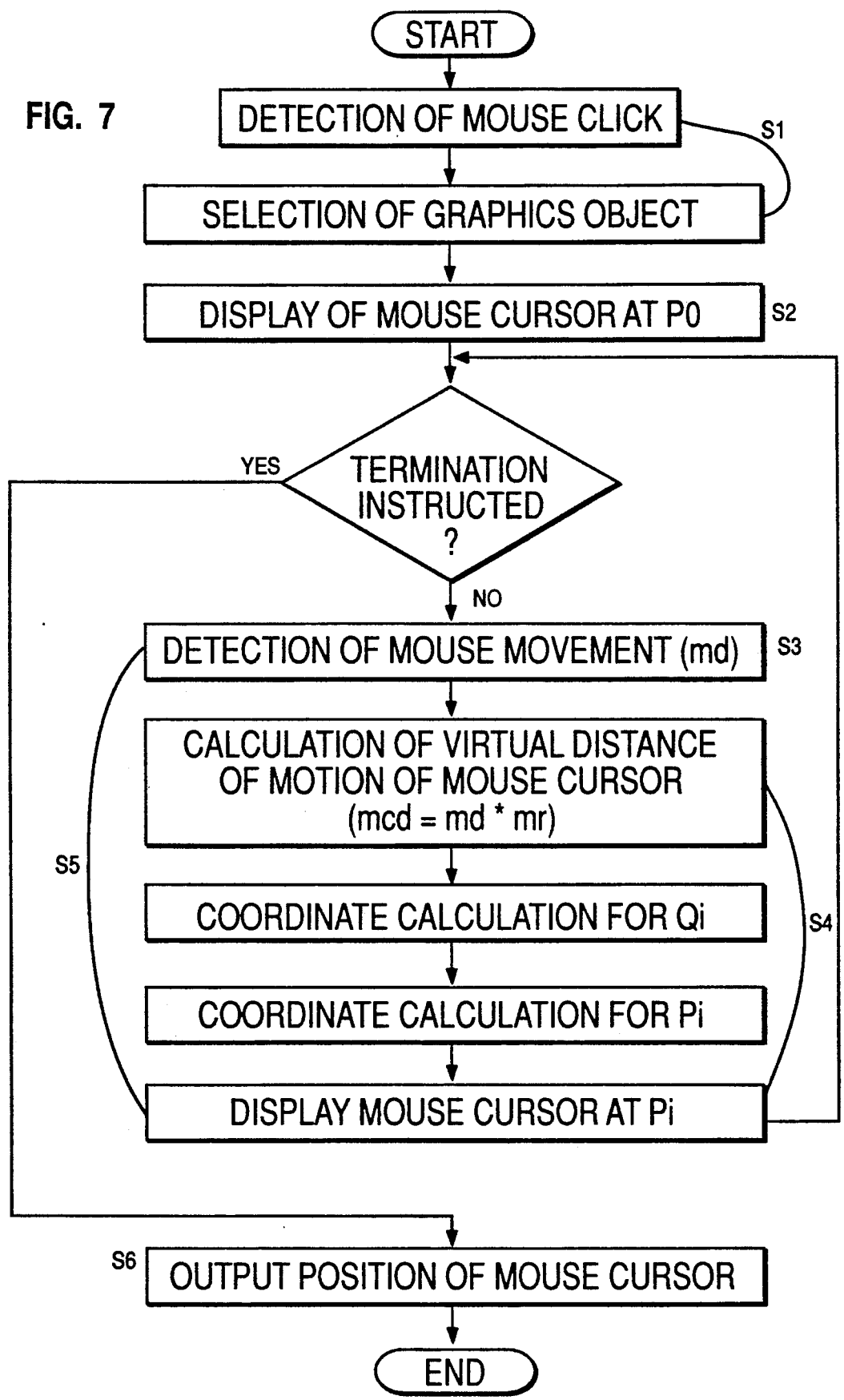
FIG. 7 is a flow chart showing a method for moving a mouse cursor while constrained on a simple segment.

FIG. 6 shows the relationship between the mouse moved on a desk and the position pointed to on the screen. The movement of the mouse on the desk is divided to small parts and thereby reduced to a series of numerous linear movements on a two-dimensional plane. The individual linear movements are mapped on the display screen. They are analyzed into the directions and distances moved by the mouse. In a conventional cursor movement control apparatus, the direction of motion B of the mouse is the direction of motion b of the mouse cursor on the display screen. In contrast, the distance of motion a of the mouse cursor is obtained by multiplying the distance of motion A of the mouse by a certain constant ratio (mr). Although the direction b and distance a are also obtained in the apparatus according to the invention, the next position of the mouse cursor is not calculated from a and b alone. This is an important feature of the invention. Henceforth, the distance a is called the virtual distance of motion of the mouse cursor and the direction b is called the virtual direction of motion of the mouse cursor.

The role of the mouse control unit 5 is summarized as a) receiving a signal indicating the direction and the distance of motion by a mouse on a desk, b) displaying the mouse cursor at a designated position on the screen of the display 4 through the display control unit 3 and deleting it therefrom, and c) sensing a click of the mouse button and generating a signal indicating the current coordinate of the mouse cursor.

The behavior of the apparatus in selecting a simple segment and a point on the segment is explained below with reference to FIGS. 7 and 8A–8E.

S1: The mouse control unit 5 detects a click of the left button of the mouse and the current coordinates of the cursor, and sends a signal indicating the coordinates through the control unit 1 to the graphics object selection unit 12. The graphics object selection unit 12 searches the graphics object table 8 and supplies the number of a graphics object having the detected coordinates within the selection effective area. When the number of the graphics object is entered, the control unit 1 searches the graphics object table 8 for the two ends of the segment and records the coordinate value in the segment end table 7 (here the ends are named A and B, respectively, and the respective coordinate values Xa, Ya, Xb and Yb).

Figure 8A:
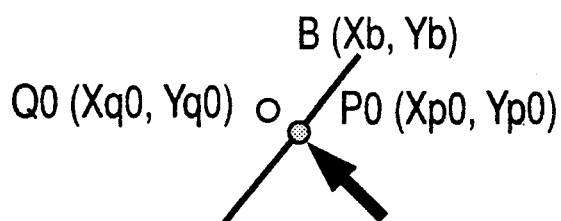
FIGS. 8A to 8E are explanatory views of steps constituting the method of FIG. 7.

S2: As shown in FIG. 8A, the mouse control unit 5 displays the mouse cursor, through the display control unit 3, at a point P0 (Xp0, Yp0), which is a projection onto the segment of the current position of the mouse cursor, namely, point Q0 (Xq0, Yq0).

Figure 9A:
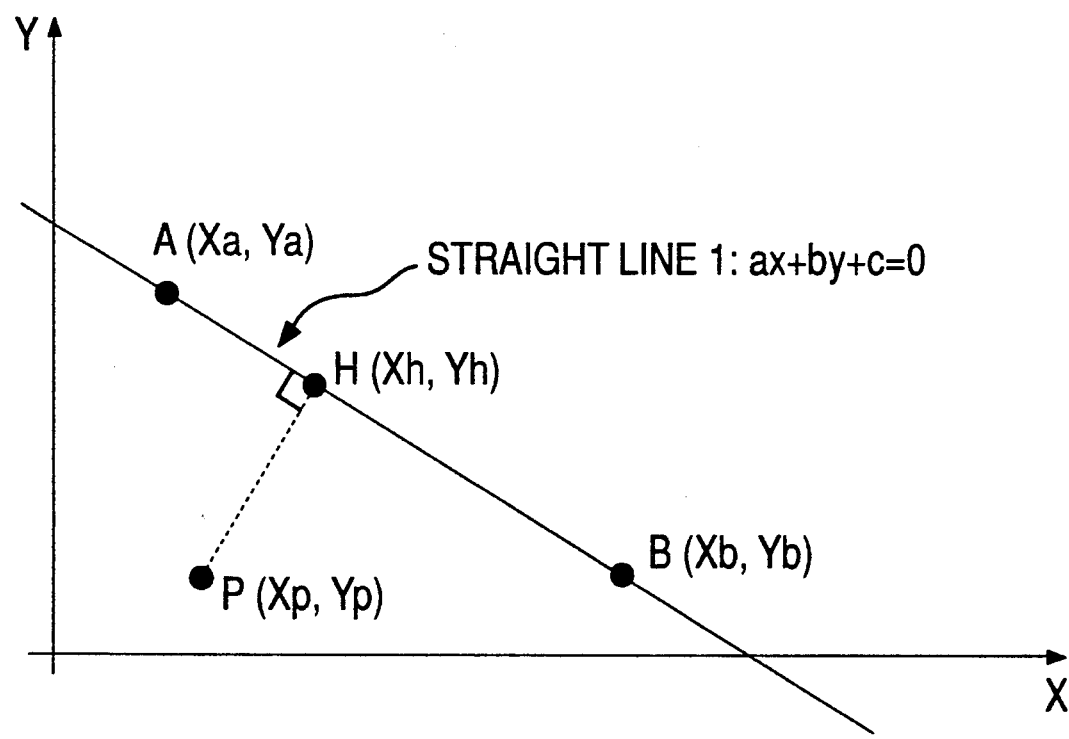
FIGS. 9A and 9B are explanatory views of an example for obtaining a projectlye point.

Since the operation for obtaining the projection of a point on a display screen onto a segment will often be referred to, an example of such a process is given below, with reference to FIG. 9A.

From the coordinates of the opposite ends A and B of a segment, the formula $ax+by+c=0$ of a straight line 1 connecting the ends is obtained by a simple calculation. When a point P (Xp, Yp) is given, the coordinates (Xh, Yh) of a projection of the point P to the straight line 1 are obtained as follows:

Since the segment PH is perpendicular to the straight line 1, $$b(Xh-Xp)=a(Yh-Yp) \qquad (1)$$

Since the point H is on the straight line 1, $$a*Xh+b*Yh+c=0 \qquad (2)$$

Since a, b, Xp and Yp are given in (1) and (2), Xh and Yh can be obtained by solving the simultaneous equations (1) and (2).

This is the simplest algorithm for obtaining a projection to a segment, obtaining precisely the foot of a perpendicular from the point P to the straight line 1 by means of equations. According to another algorithm that does not solve the equations directly, an obtained projection H' may deviate somewhat from the point H. However, so long as the projection is a point near the point H, a deviation of the order of several pixels is immaterial. Thus the term "projected point" used in the specification also includes points other than that at the foot of a perpendicular in a strict sense.

Figure 9B:
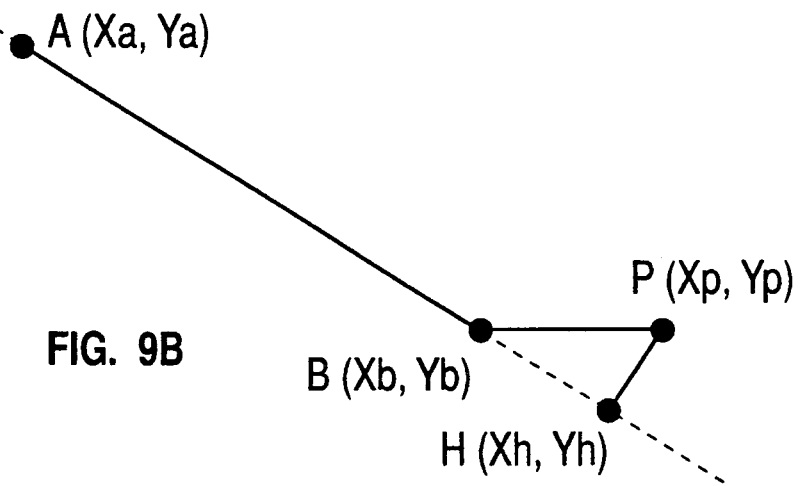

As shown in FIG. 9B, it may occur that the foot H of a perpendicular obtained by a specific algorithm does not ride on the segment, in other words, that Xh<Xa or Xb<Xh for Xh and Yh<Yb or Ya<Yh for Yh. In this case, whichever of A and B is nearest to the point P is regarded as the projected point. In FIG. 9B, the projection of point P onto the segment is point B.

S3: When the mouse control unit 5 detects a movement of the mouse 6, the virtual distance of motion mcd of the mouse cursor on the display screen is obtained by multiplying the distance of motion md of the mouse on the desk by the foregoing ratio mr.

Figure 8B:
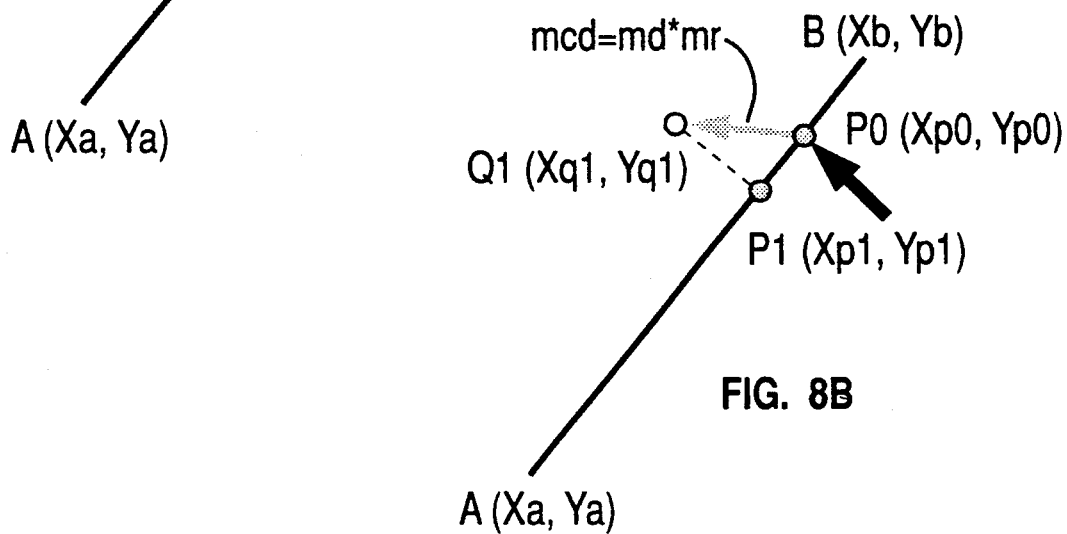
Figure 8C:
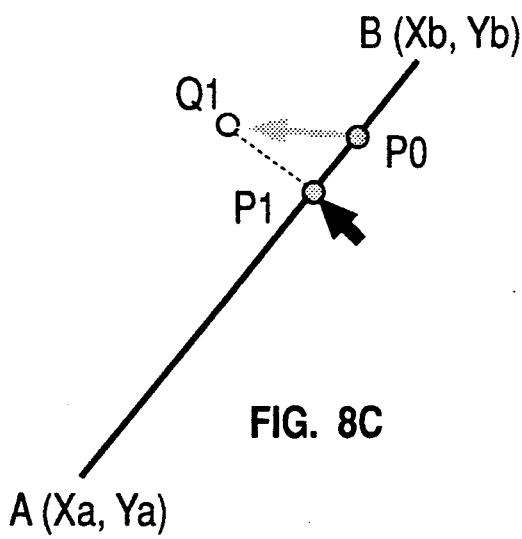

S4: The point Q1 at a distance of mcd from the point P0 in the direction of motion of the mouse on the display screen is first obtained, and the projection P1 of the point Q1 onto the segment AB is then obtained (FIG. 8B). Thereafter, the mouse control unit 5 deletes the mouse cursor located at P0 through the display control unit 3, and newly displays the mouse cursor at P1 (FIG. 8C).

Figure 8D:
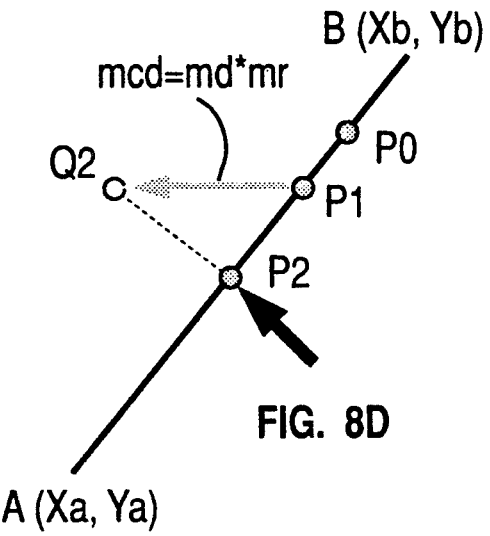
Figure 8E:
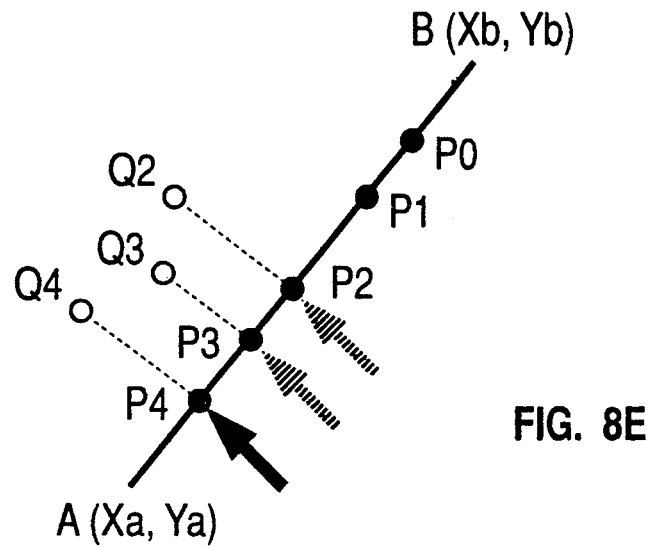

S5: S3 and S4 are repeated until a termination instruction (a click of the mouse button) is given, thereby obtaining Q1, P1, Q2, P2 . . . in sequence and moving the mouse cursor accordingly (FIGS. 8D and 8E).

S6: When the user clicks the mouse button to enter a signal instructing that a point be selected, the repetition is terminated, and the current coordinates of the mouse cursor are outputted.

Calculation of the coordinate values of P0, P1, Q0, Q1, and so on is performed by the arithmetic unit 2 on the basis of information stored in the segment end table 7. These necessary data are temporarily recorded in the data storage area 11, and are deleted when deemed unnecessary.

Figure 10A:
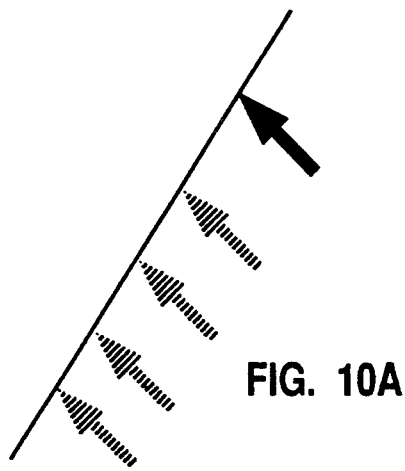
FIGS. 10A and 10B are explanatory views of a cursor movement according to the method of FIG. 7.
Figure 10B:
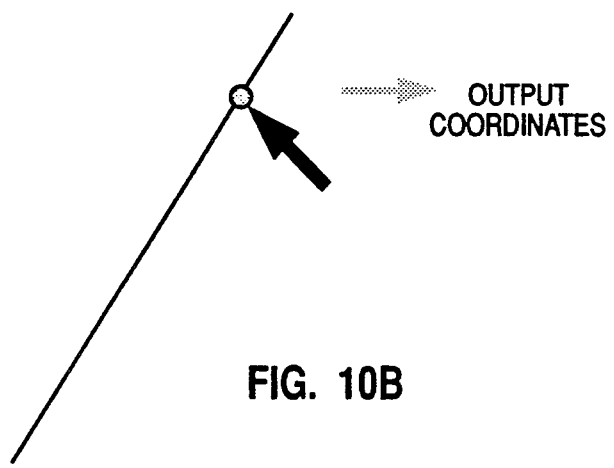

As a result, in response to a movement of the mouse, the mouse cursor moves while constrained on the segment AB on the display (FIG. 10A), and in response to a click of the mouse button, the current coordinates of the point on the segment are finally selected (FIG. 10B).

Figure 11:
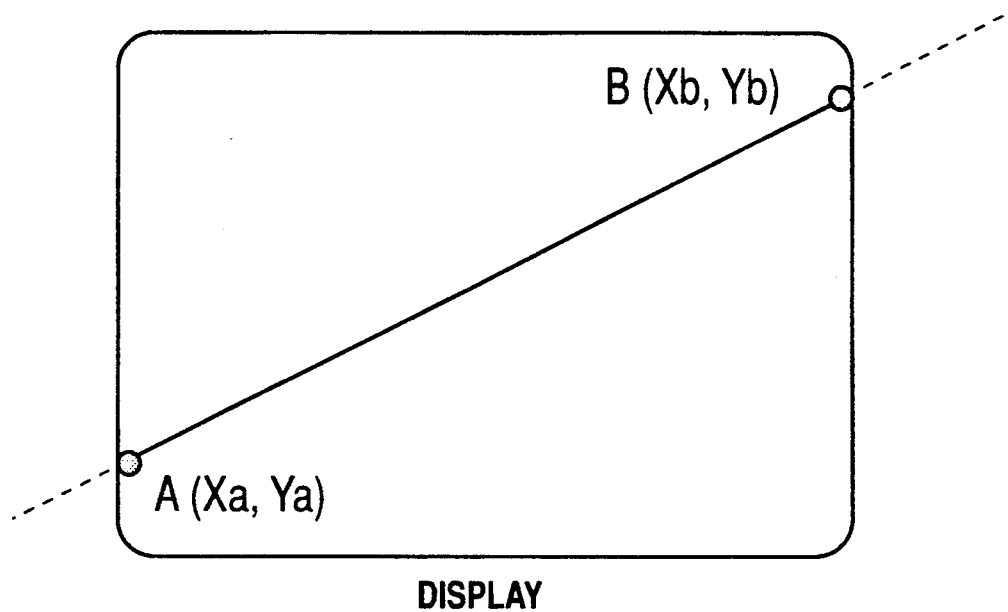
FIG. 11 is an explanatory view of a graphics object in the form of a straight line.

If the target graphics object, namely, the object to be followed by the cursor, is a straight line or a half line, the coordinates of the two points at opposite ends of the visible part of the straight line or the half line on the display are calculated by referring to the graphics object table 8. The foregoing steps S1 to S6 are then performed, taking points A and B as the end points in the base of the above segment (see FIG. 11).

Figure 12:
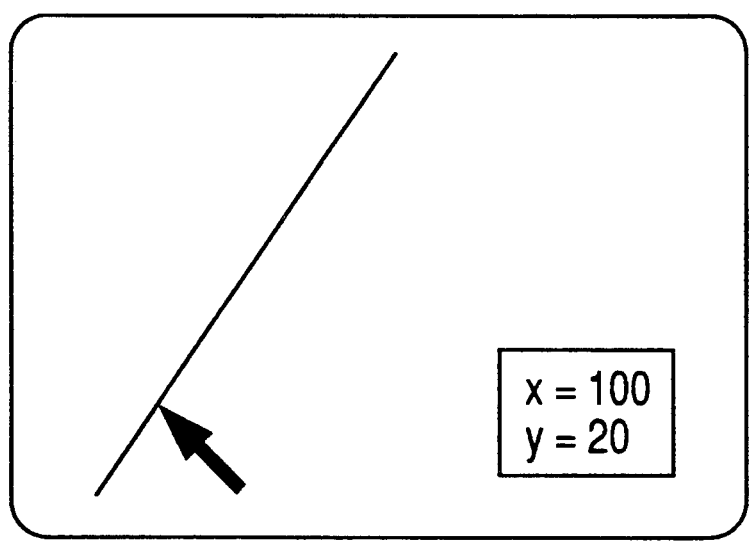
FIG. 12 is an explanatory view of an example of the display of positional information.

When a coordinate display mode is designated, the position coordinate display unit 9, on every movement of the mouse cursor, displays new values for the coordinate of the mouse cursor on the display 4 through the display control unit 3, as shown in FIG. 12.

If the target graphics object is a simple segment, a function for displaying information on the division of the segment by means of the current position of the cursor may be utilized in addition to the function for displaying the values of the coordinates of the mouse cursor. A continuous mode and a discontinuous mode are available for displaying divisional information.

Figure 13:
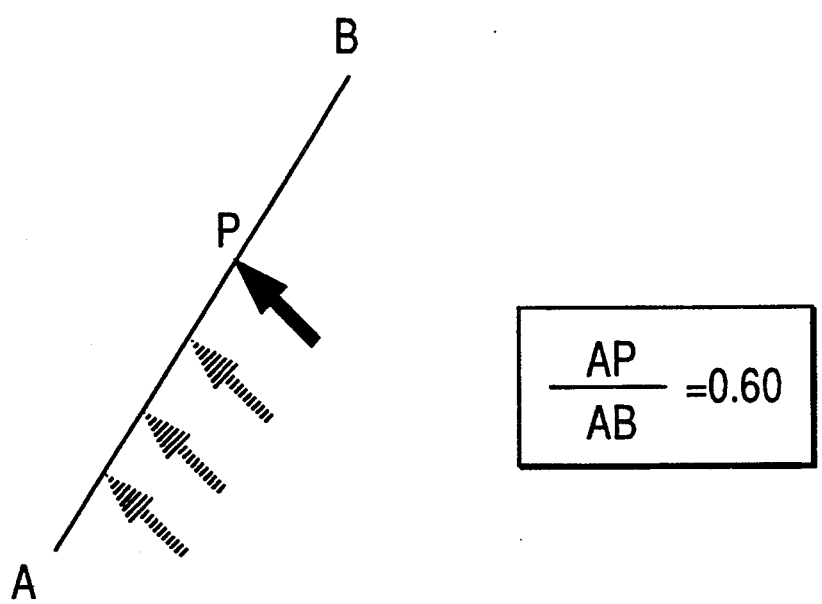
FIG. 13 is an explanatory view of an example of the display of segment divisional information.

Assuming that the opposite ends of a segment are A and B and that the current position of the cursor is P, the ratio display unit 10 displays the value of AP/AB on the screen of the display 4 through the display control unit 3, as shown in FIG. 13 in the continuous mode. The value of the ratio is renewed for every movement of the mouse.

Figure 14:
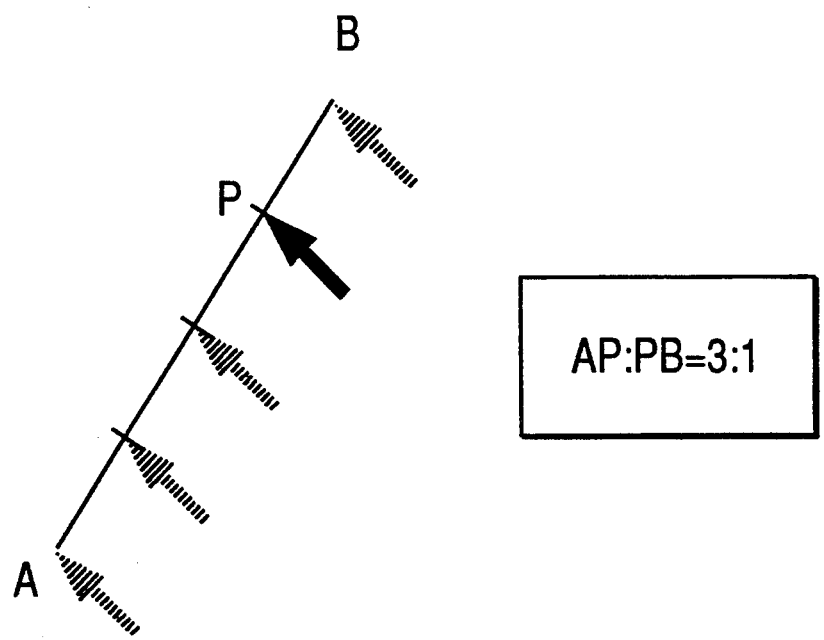
FIG. 14 is an explanatory view of another example of the display of segment divisional information.

In the discontinuous mode, the segment AB is first divided virtually into n pieces of equal parts. In this mode, the mouse cursor can move only to a total of (n+1) points, which are located at the opposite ends A and B and at (n−1) points dividing the segment internally. The ratio is displayed as "i:n−1", using an integer i (0≦i≦n). FIG. 14 shows an example in which a selection is made from quadrisectional points on the segment while the ratio is displayed in the discontinuous mode. By using the discontinuous mode as in this example, a user can readily select points dividing a segment into equal parts.

Figure 15A:
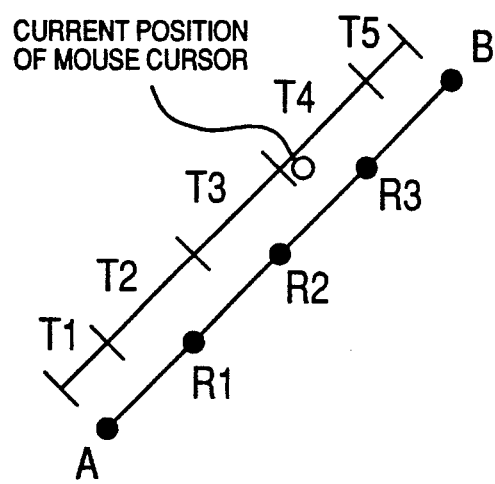
FIGS. 15a to 15D are explanatory views of a discontinuous mode.

The discontinuous mode is explained below in detail. When the value n of equal division is 4, the equal-divisional points R1, R2 and R3 of the segment AB are determined as shown in FIG. 15A. Subsequently, five intervals (T1, T2, T3, T4 and T5) are set on the target segment AB. Interval T1 includes point A alone, interval T2 includes point R1 alone, interval T3 includes point R2 alone, interval T4 includes point R3 alone, and interval T5 includes point B alone. The boundary between intervals T1 and T2 is the mid-point of the segment AR1, the boundary between intervals T2 and T3 is the mid-point of the segment R1R2, the boundary between intervals T3 and T4 is the mid-point of the segment R2R3, and the boundary between intervals T4 and T5 is the mid-point of the segment R3B.

Figure 15B:
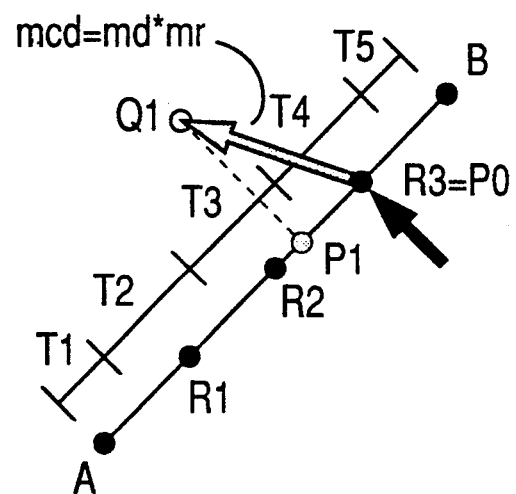
Figure 15C:
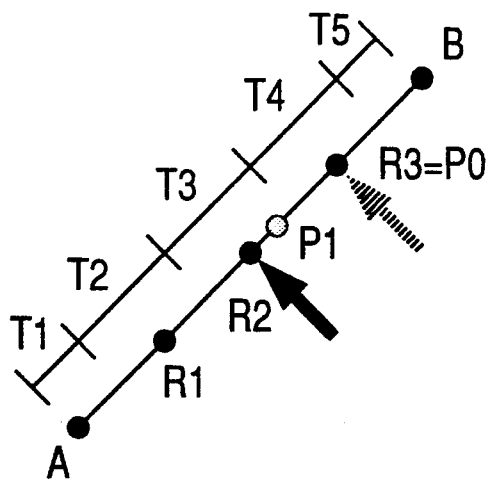
Figure 15D:
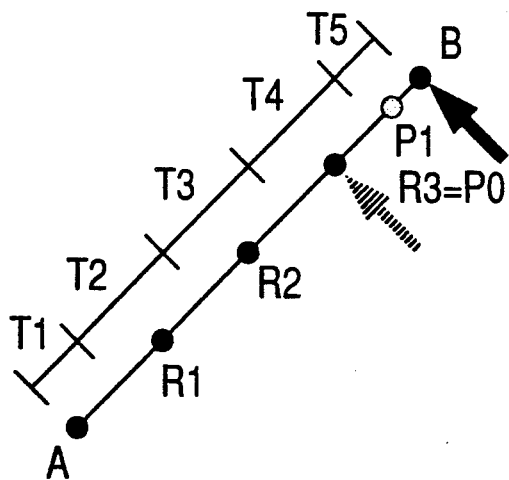

Except that the display of the mouse cursor is renewed only when the interval including the point Pi is changed, the same operation as the aforementioned operation for selecting an arbitrary point on the segment is performed. First, the point nearest to the current position of the mouse cursor is selected from the five points (A, B, R1, R2 and R3) shown in FIG. 15a. In this example, it is point R3. Point R3 is regarded as P0. When the movement md of the mouse is detected, mcd=md·mr is calculated, and a point Q1 at a distance of mcd from the point P0 in the direction of motion of the mouse is obtained. The projection of Q1 onto the segment AB is shown at P1 (FIG. 15B). When P1 is included in interval T3, the mouse cursor is deleted from R3 and shown at R2 (FIG. 15C). If Pi is included in interval T5, the mouse cursor is deleted from R3 and shown at B (FIG. 15D). In this fashion, respective effective intervals Tm of discontinuous points are determined so as to display the mouse cursor at a corresponding discontinuous point (in this example, one of several points that divide the segment into equal parts) for every change in the interval in which the projection Pi is located. As a result, as shown in FIG. 14, the mouse cursor moves while constrained only on points dividing the segment into equal parts, and the values of the coordinates of one of these points are obtained by a clock of the mouse button.

If a target graphics object is a simple segment, the user can designated whether the coordinate value should be displayed, whether the ratio should be displayed, if so, whether in the continuous mode or in the discontinuous mode and, if in the discontinuous mode, what should be the value n of equal division. For this, an input device such as a mouse button or a keyboard may be used. An arrangement may be employed that is capable of switching the modes at an arbitrary point of time before the selection of a point on the graphics object. Further, the value n of equal division in the discontinuous mode may be variable.

Provided below, with reference to FIGS. 16 and 17A–17E, is an explanation of the behavior of the apparatus when the target graphics object is a curve.

Figure 17A:
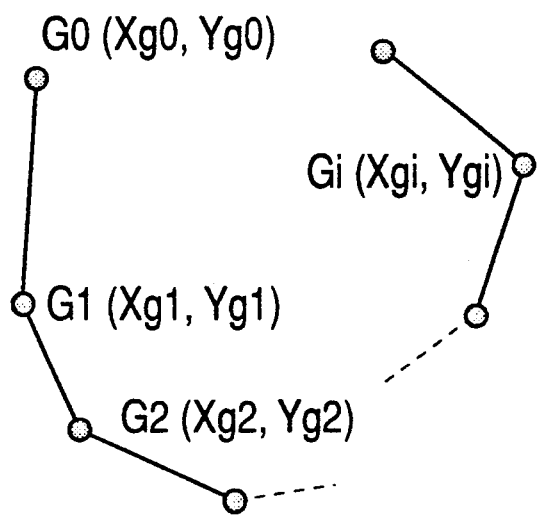
FIGS. 17A to 17F are explanatory views of steps constituting the method of FIG. 16.

Here, a curve means a continuous curve on a two-dimensional plane. A curve is often treated as a continuous series of segments (a polygonal line) in a graphics processing unit for display purposes. In the apparatus shown in FIG. 1, the data on a curve object are represented in the graphics object table 8 as a row of coordinates of the vertices of the polygonal line. Assume here that the target graphics object in the form of a curve is represented in the table 8 by a row of points $G0(Xg0, Yg0)$, $G1(Xg1, Yg1)$, ... $Gi(Xgi, Ygi)$ on a two-dimensional plane, in other words, that the curve is approximately represented by i segments connecting two adjacent points in this row (FIG. 17A).

S11: This is the same as operation of S1 for a simple segment.

Figure 17B:
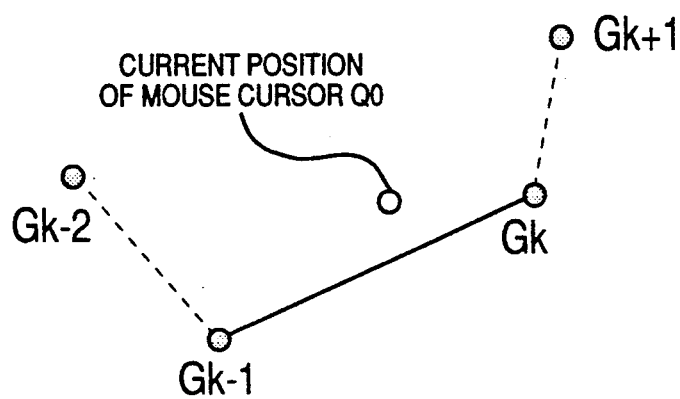

S12: The segment nearest to the current position Q0 of the mouse cursor is selected. Specifically, projections of point Q0 are obtained for respective segments, and the distances between the respective projections and the point Q0 are obtained. These distances are compared with each other. Here, a segment $Gk-1 \cdot Gk$ ($1 \leq k \leq i$) has been selected at random (FIG. 17B).

S13: By the same operation as S2 for a simple segment, the point P0 that is nearest to point Q0 on segment Gk−1·Gk is obtained, and the mouse cursor is displayed at point P0. The difference from S2 is that positional information on point P0 is stored as Prev. Prev is used in later steps.

S14: This is the same as operation S3 for a simple segment. The direction and distance of motion of the mouse are detected.

S15: The virtual distance mcd of the mouse cursor on the display screen is calculated. Since the virtual direction of motion of the mouse cursor is the same as the direction of motion of the mouse, this results in the moving vector of the mouse being mapped onto the display screen.

The following operations, S16 and S17, are used for determining the segment li on which the mouse cursor rides.

S16: A test is performed to decide whether or not the point at which the cursor is currently displayed, namely, the point Prev, coincides with an end of segment Gk−1·Gk, which is either point Gk−1 or point Gk. The drawing shows the test for point Gk alone for simplicity; the same test is performed for Gk−1.

Figure 17C:
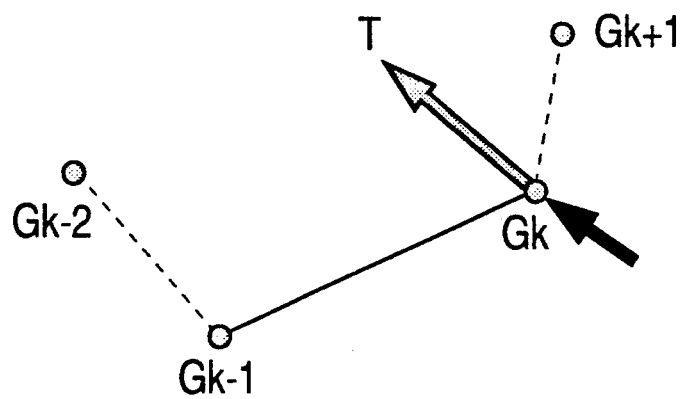
Figure 17D:
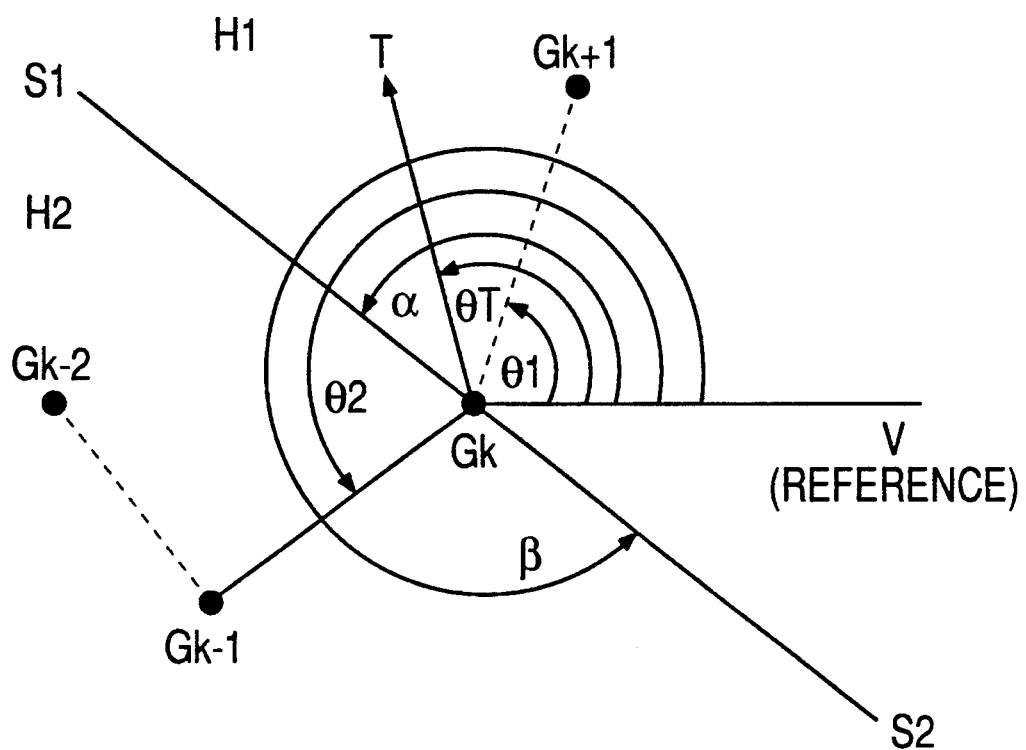
Figure 17E:
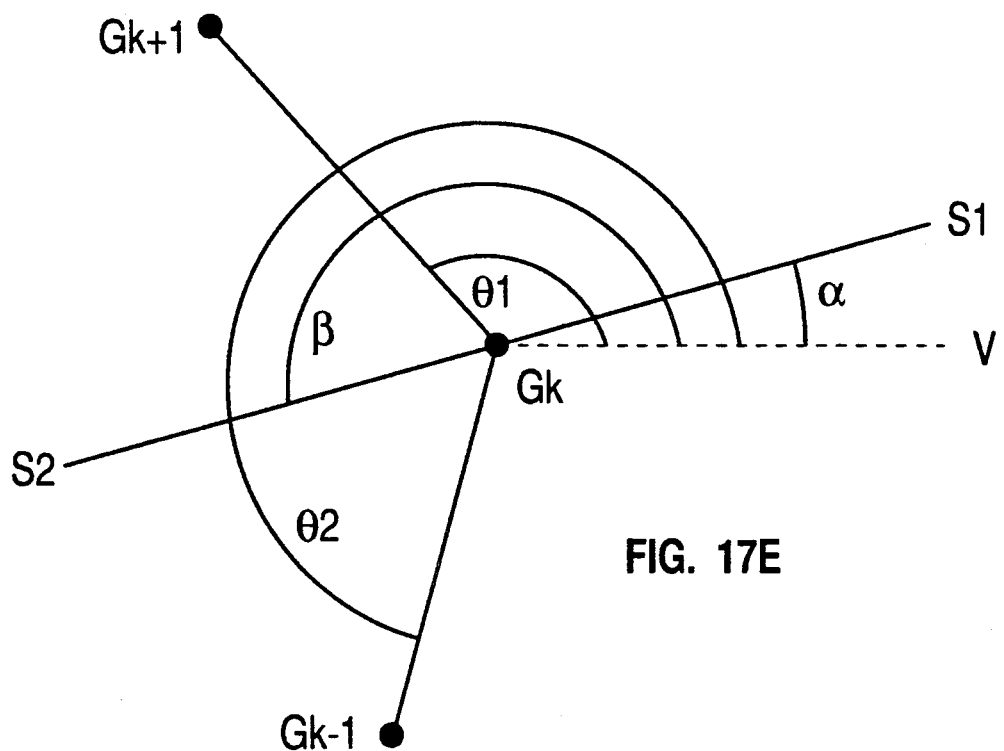

S17: If the result of the test in S16 is positive, one of the two segments having point Prev as its end is selected on the basis of a virtual moving vector T of the mouse cursor on the display screen. For simplicity, an explanation is given only for the case in which point Prev coincides with point Gk, as shown in FIG. 17C. In this case, as shown in FIG. 17D, the display screen is divided into two parts, H1 and H2, by a line bisecting the angle defined by adjacent two segments Gk−1·Gk and Gk·Gk+1, and the vector of mouse movement T mapped onto the display screen determines whether the detected mouse movement is to move the mouse cursor to H1 or to H2.

This operation is explained below in greater detail. The half-line V extending horizontally and rightward from point Gk is taken as a reference line for the angle on the display screen. The angle $\theta 1$ defined by segment Gk·Gk+1 and reference line V and the angle $\theta 2$ defined by segment Gk·Gk−1 and reference line V are obtained by calculating inverse trigonometric functions by using the coordinates of points Gk−1, Gk and Gk+1. The angle $\theta T$ defined by the vector T and the reference line V is also obtained by calculating the inverse trigonometric function. When the line bisecting the angle defined by two segments Gk·Gk−1 and Gk·Gk+1 is divided into S1 and S2 at point Gk, the angle $\alpha$ defined by S1 and reference line V and the angle $\beta$ defined by S2 and reference line V can be calculated as follows ($\alpha < \beta$):

If $0 < (\theta 1 + \theta 2)/2 < \pi$ (FIG. 17D), $$\alpha = (\theta 1 + \theta 2)/2$$

$$\beta = \alpha + \pi \quad \text{(i)}$$

If $\pi \leq (\theta 1 + \theta 2)/2 < 2\pi$ (FIG. 17E), $$\alpha = \beta - \pi$$

$$\beta = (\theta 1 + \theta 3)/2 \quad \text{(ii)}$$

where both of the foregoing angles are equal to or larger than 0 radians and smaller than $2\pi$ radians.

It can be determined as follows whether the movement is to H1 or H2:

If $0 \leq \theta T < \alpha$, movement is toward H1.
If $\alpha \leq \theta T < \beta$, movement is toward H2.
If $\beta \leq \theta T < 2\pi$, movement is toward H1.

If S17 determines that the movement is toward H1, segment Gk−1·Gk is determined to be segment li. If S17 determines that the movement is toward H2, segment Gk·Gk+1 is determined to be segment li.

If the result of the test in S16 is negative, segment Gk·Gk+1 is determined to be segment li without executing S17.

Figure 17F:
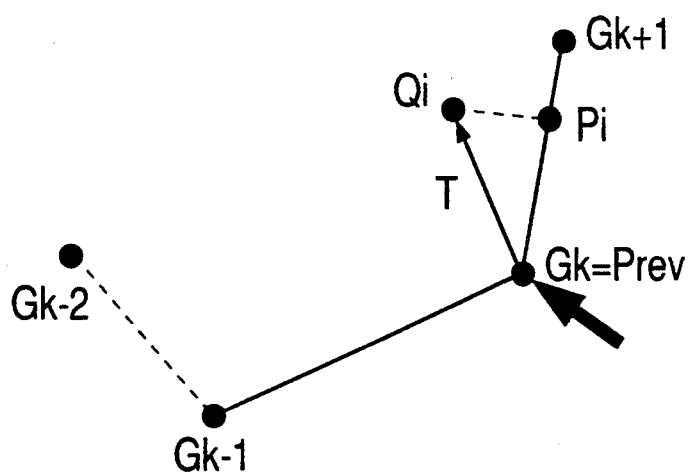

S18: As shown in FIG. 17F, the coordinates of a virtual point Qi of the mouse cursor, which reflects the mouse movement on the display screen, are calculated on the basis of the vector of mouse movement T mapped onto the display screen and the coordinates of point Prev.

S19: The coordinates of point Pi, which is the projection of point Qi onto segment li, are calculated.

S20: A cursor is displayed at point Pi, and point Prev is renewed to point Pi.

S14 to S20 are repeated until a termination instruction (a click of the mouse button) is given.

S21: When the user clicks the mouse button to enter a signal that a point should be selected, the same operation as S6 for a simple segment is performed.

Figure 18A:
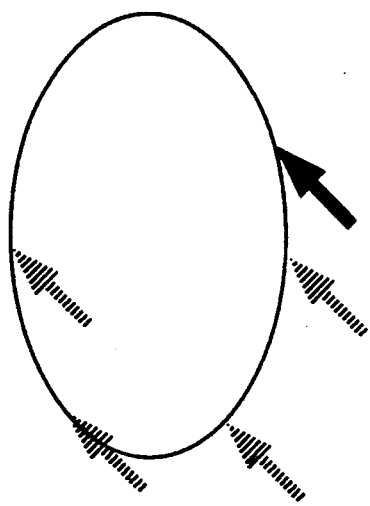
FIGS. 18A and 18B are explanatory views of cursor movement according to the method of FIG. 16.
Figure 18B:
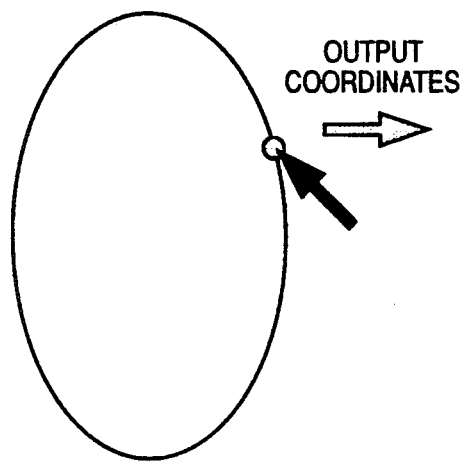

As a result, the mouse cursor moves along the continuous series of segments shown in FIG. 18A, that is, while constrained on the target curve, in response to the movement of the mouse cursor. Finally, a point on the curve is selected upon entry of a termination instruction.

Figure 16:
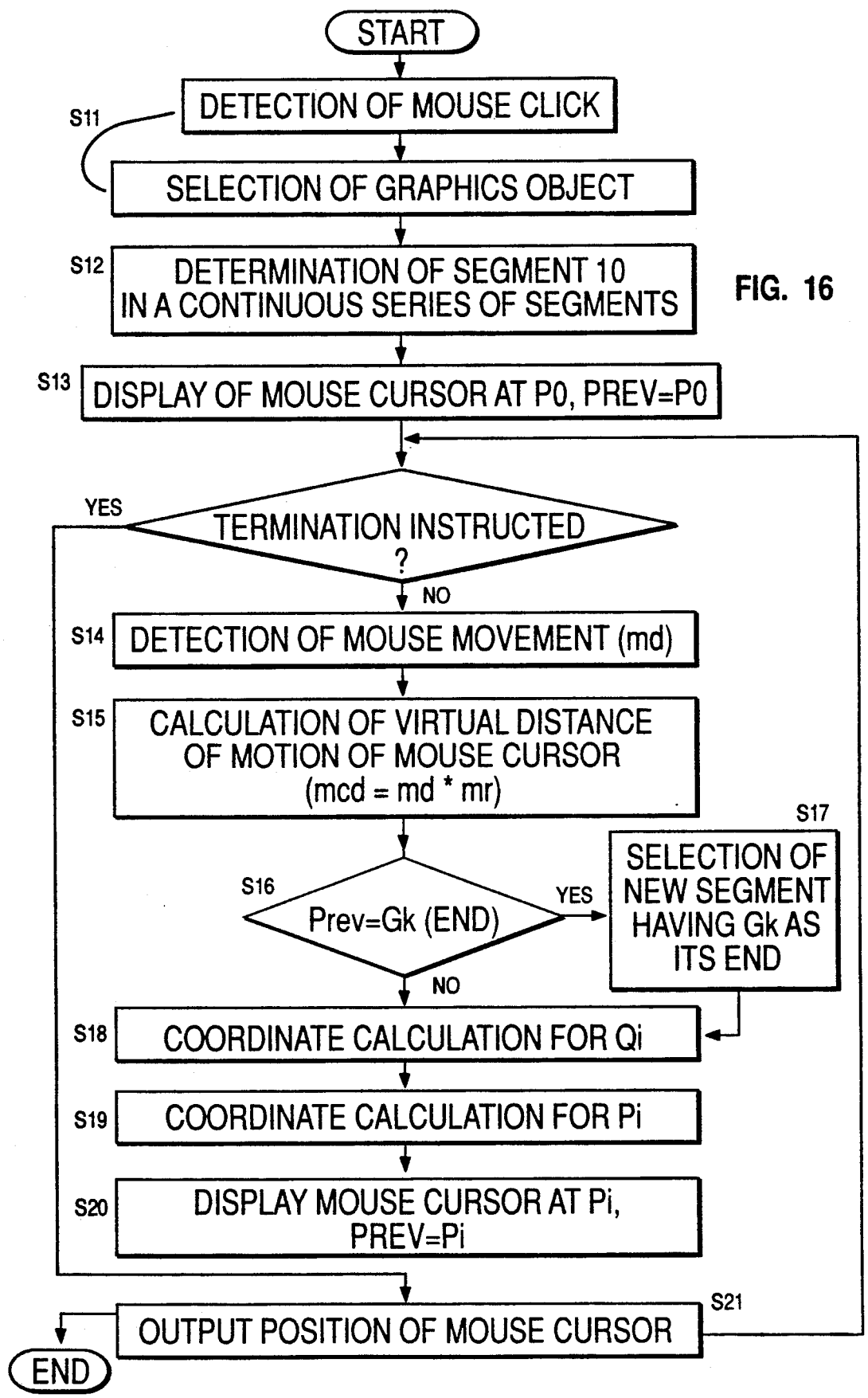
FIG. 16 is a flow chart showing a method for moving a mouse cursor while constrained on a continuous series of segments.

If a contour is managed as a continuous series of segments, the processing shown in FIG. 16 is applicable to moving the cursor while constrained on the contour for a graphics object, which is defined as also including the area enclosed by the segments.

Figure 19:
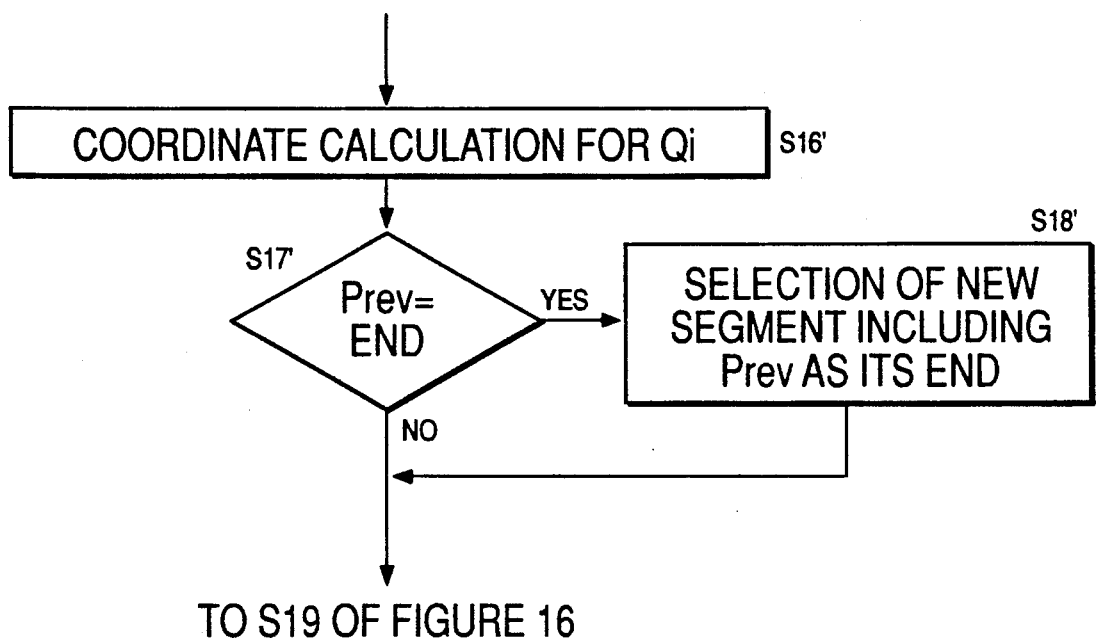
FIG. 19 is a flow chart showing a modification of the method of FIG. 16.

Some modifications follow for the foregoing operations S16 to S18. A typical example is shown in FIG. 19 and explained below.

S16': The coordinates of point Qi are calculated on the basis of the vector of motion of the mouse mapped on the display screen, which was determined in S15.

S17': It is determined whether point Prev is an end of a segment or not. If so, point Pi is obtained, and segment li is regarded as the segment on which the mouse cursor currently rides.

S18': When the result of S17' is positive, segment li is selected from two segments a and b having point Prev as their ends. The projections Qa and Qb of point Qi onto segments a and b are obtained, respectively, and the distances QiQa and QiQb are further obtained. If $QiQa \leq QiQb$, segment a is determined to be segment li. If $QiQb \leq QiQa$, segment b is determined to be segment li.

Figure 20:
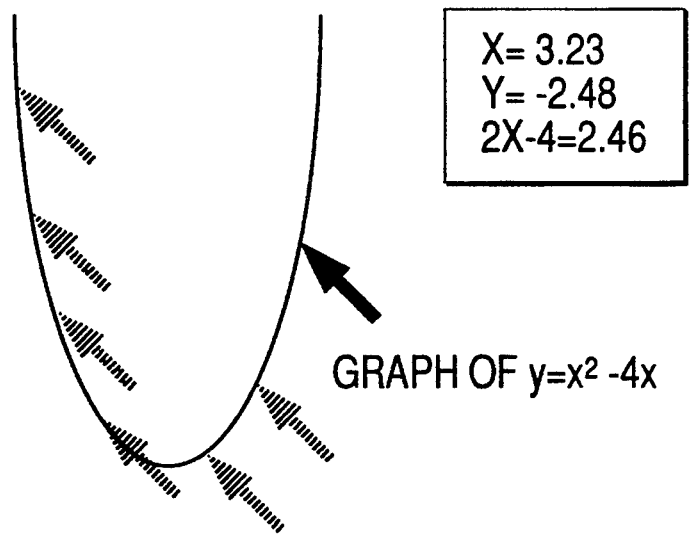
FIG. 20 is an explanatory view of a cursor movement on a parabola and displayed information.
Figure 21:
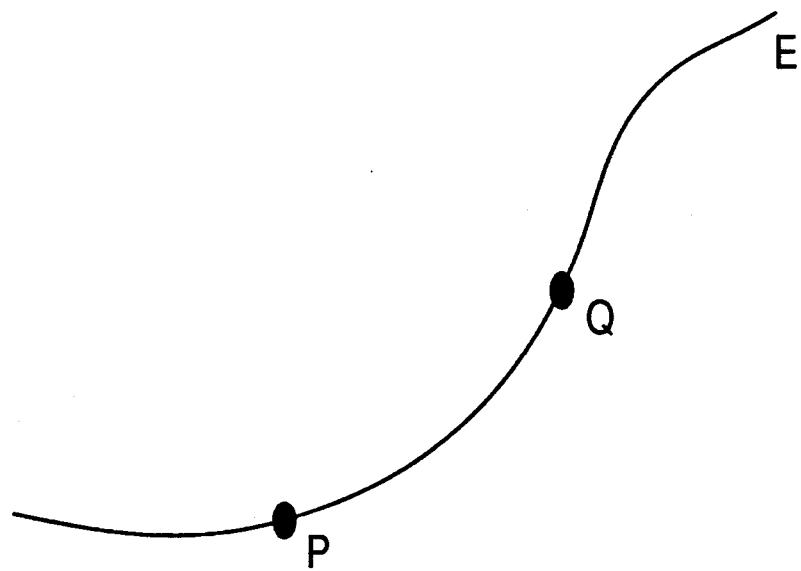
FIGS. 21, 22a and 22B are explanatory views of an example of a conventional technique.
Figure 24:
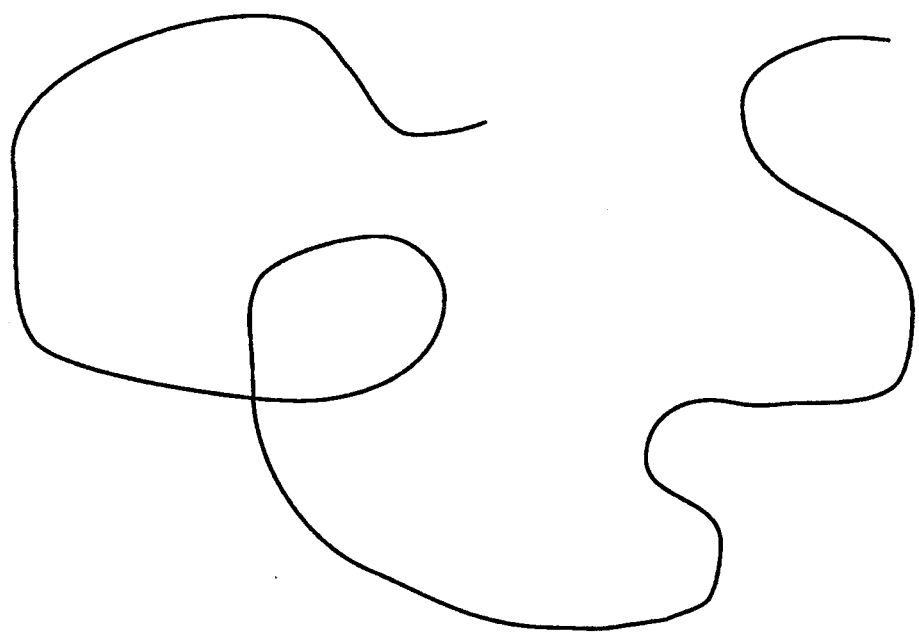
FIGS. 23A, 23B and 24 are explanatory views of another example of a conventional technique.
Figure 22A:
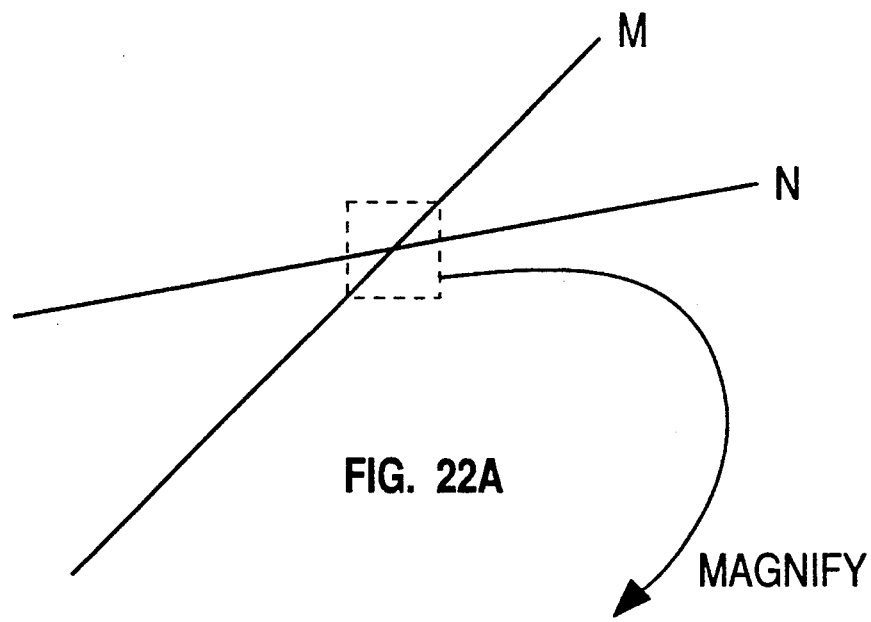
Figure 22B:
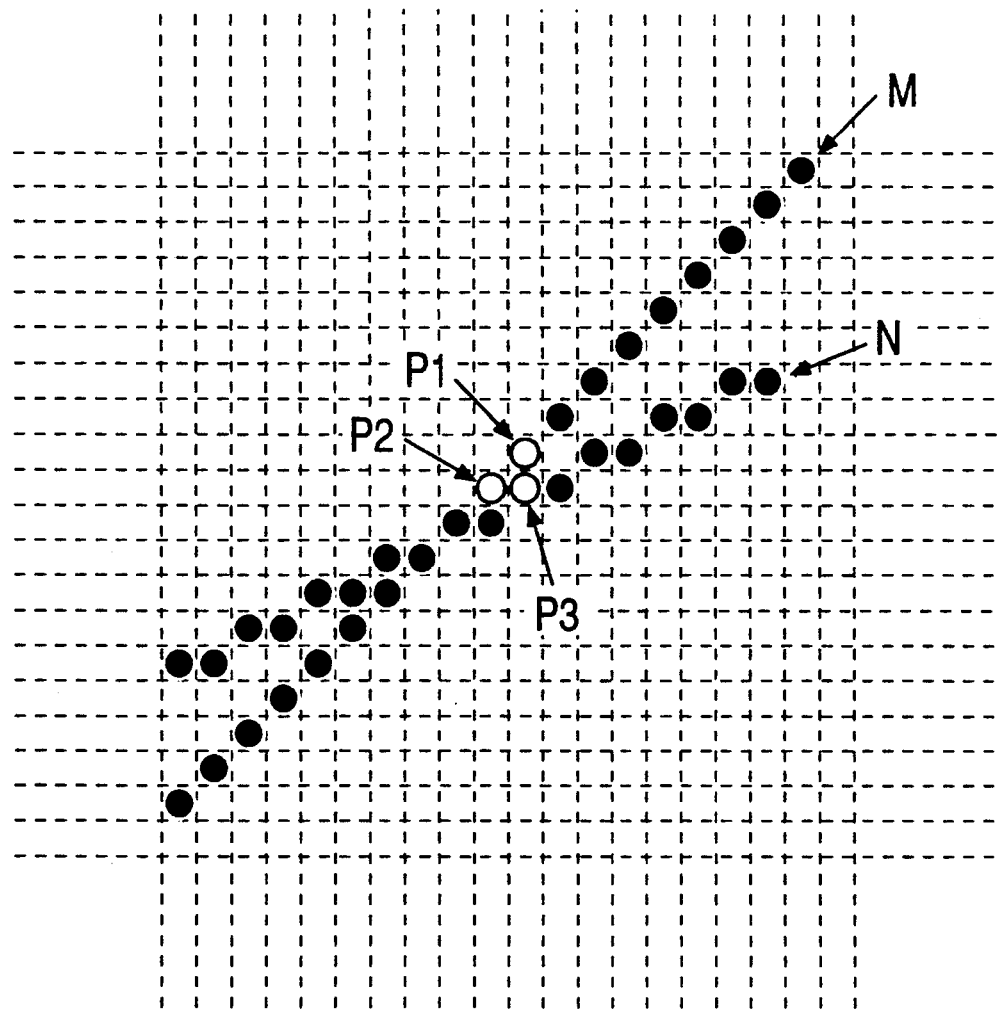
Figure 23A:
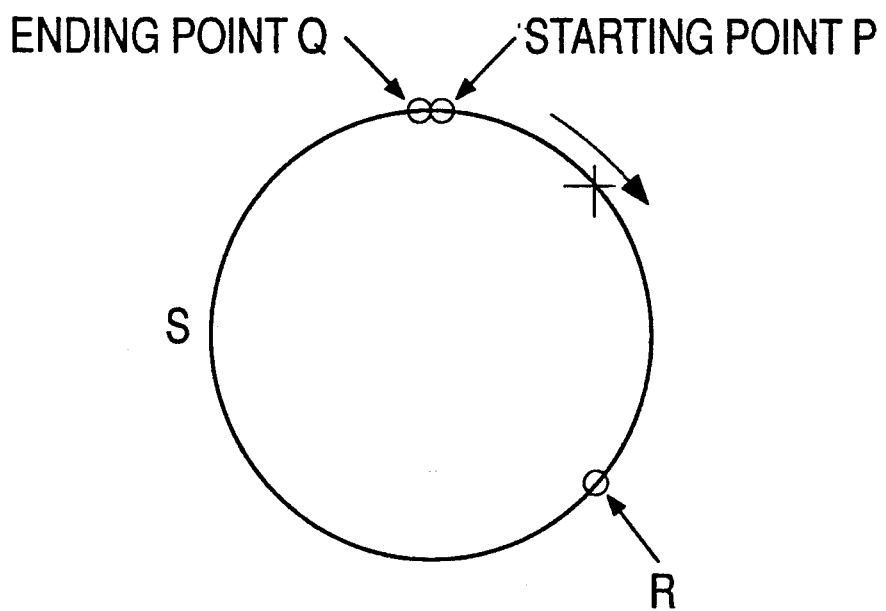
Figure 23B:
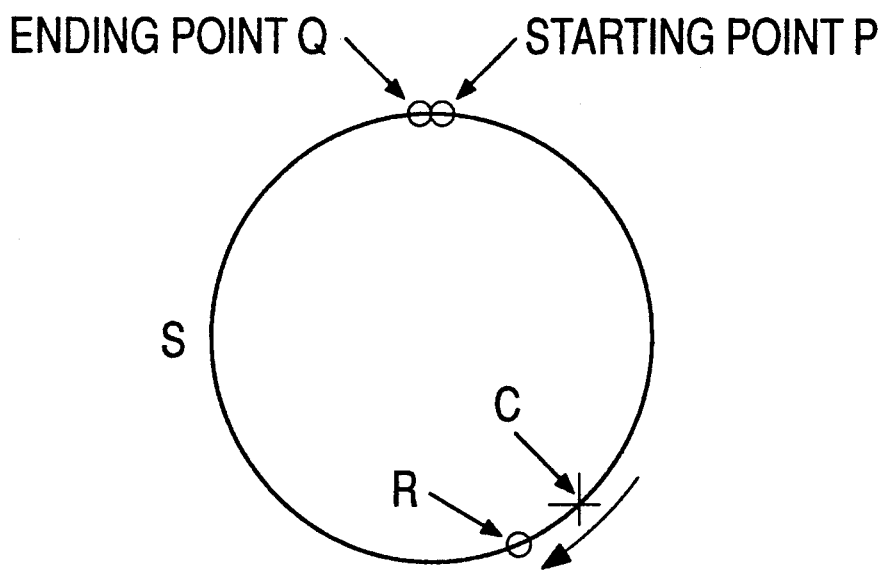

When the designation of the coordinate display mode is entered, the position coordinate display unit 9 displays a new coordinate value of the mouse cursor on the screen of the display 4 through the display control unit 3 on every movement in all the foregoing processes where the mouse cursor moves. In the example shown in FIG. 20, the value of the derived function (2X−4) is also displayed, in addition to the coordinate values (X, Y). When the target graphics object is a graph of a function on the xy plane, a faculty for displaying, in addition to the values of coordinates, the value of a numerical expression calculated from these values may be added so as to provide a useful user interface application in a software system for learning mathematics.

In the foregoing example, once a graphics object on the display screen is selected, the subsequent movement of the cursor are automatically constrained on the graphics object. However, selection of the graphics object is not only for the purpose of selecting a point thereon. In this connection, in addition to the constraint mode provided by the invention, an unconstrained mode that permits movement of the mouse cursor in a conventional technique may be provided to allow a user to specify either mode before selecting a graphics object. Alternatively, so that a user can quickly switch to a desired operation other than selection of a point, the system may be so designed that the constraint mode is switched to the unconstrained mode before selection of a point on a graphics object. In this case, a signal indicating the switch to the unconstrained mode terminates repetition of S3 and S4 in FIG. 7 or repetition of S14 to S20 in FIG. 16.

In the foregoing example, a mouse is used as a pointing device. However, the present invention allows a light pen, joy stick, or other device to be used for pointing to a point on the display screen. Moreover, the invention is applicable to a computer system with touch panel, in which a user points to a point on the display screen by pressing the panel instead of using a pointing device.

Further, application of the invention is not limited to the case in which a graphics object is managed as a simple segment or a continuous series of segments in a computer. For example, in the case of a circle, the functional formula F(x,Y) of the circle may be registered directly in the graphics object table, or alternatively, data on the center and radius alone of the circle may be registered. In this case, in order to obtain a projective point of a certain point P to the circle, the intersections with circle of the straight line connecting the center of the circle and point P are obtained, and whichever of the two obtained intersections is nearer to point P may be selected. Therefore, by deleting steps S12, S16, S17 in FIG. 16 and obtaining the projectlye points in S13 and S19 in such a way, the constrained mode can be implemented. It is noted, however, that management of the graphics object as a continuous sines of segments in the computer is more advantageous in that it allows faster calculations.

The invention makes it possible to track a graphics object by means of a cursor, without requiring the prior specification of points or directions for tracking. Further, it allows direct control by a user of the movement of a cursor constrained on the graphics object.

We claim:

1. A method for moving a cursor on one of a plurality of graphics objects displayed on a display screen, comprising the steps of:
   (a) entering a signal for pointing to a position on the display screen;
   (b) determining a point on the display screen in response to the signal entered in step (a);
   (c) selecting a particular graphics object of said plurality of graphics objects;
   (d) determining a point on said particular graphics object which is near to the point determined in step (b);
   (e) displaying a cursor at the point determined in step (d); and
   (f) repeating said steps (a) to (e) until a signal indicative of a cursor constraint release is entered.

2. The method according to claim 1 wherein said signal indicating said cursor constraint release instructs that a point be selected on said particular graphics object.

3. The method according to claim 2 wherein said step (e) deletes the cursor that has been displayed heretofore.

4. The method according to claim 3 wherein said step (e) displays positional information on said point determined in step (d).

5. The method according to claim 4 wherein said signal entered in step (a) indicates the direction and distance of motion of a mouse.

6. The method according to claim 5 wherein said graphics object is represented by a segment on the display screen.

7. The method according to claim 6 wherein there are further included steps of virtually dividing said segment into n intervals (where n is 2 or a larger integer) in response to an instruction from the user and of determining representative points in said n intervals.

8. The method according to claim 6 wherein said point determined in step (d) is obtained by projecting the point determined in step (b) onto said particular graphics object.

9. The method according to claim 8 wherein said graphics object is a segment and said step (d) further displays information on a division of said segment by the point determined in step (c).

10. A method for moving a cursor on one of a plurality of graphics objects represented by a continuous series of segments on a display screen, comprising the steps of:
    (a) entering a signal for pointing to a position on the display screen;
    (b) selecting a particular graphics object of said plurality of graphics objects;
    (c) determining a segment li from the continuous series of segments displayed on the display screen and a point Qi on the display screen, in response to the signal entered in step (a);
    (d) determining a point Pi that is a projection of said point Qi onto the segment li;
    (e) displaying a cursor at said point Pi; and
    (f) repeating said steps (a) to (e) until a signal indicative of a cursor constraint release is entered.

11. The method according to claim 10 wherein said signal indicating said cursor constraint release instructs that a point be selected on said particular graphics object.

12. The method according to claim 11 wherein the signal entered in step (a) indicates the direction and distance of motion of a mouse.

13. The method according to one of claim 12 wherein said step (c) determines whether the point at which the cursor is displayed is an end of a segment or not and, if said point at which the cursor is displayed is said end of said segment, selects segment li, in response to the signal entered in step (a), from the segment including the point at which the cursor is currently displayed and the segment adjacent to said segment and, if said point at which the cursor is displayed is not said end of said segment, determines the segment including the point at which the cursor is currently displayed to be segment li.

* * * * *

UNITED STATES PATENT AND TRADEMARK OFFICE
CERTIFICATE OF CORRECTION

PATENT NO. : 5,327,528

DATED : Jul. 5, 1994

INVENTOR(S) : Kazuyoshi Hidaka and Masanori Akaishi

It is certified that error appears in the above-identified patent and that said Letters Patent is hereby corrected as shown below:

Title page, in the title, second line, please delete "CONTROL" and insert
—ON A SELECTED GRAPHICS OBJECT—;

Col. 1, line 3, please delete "CONTROL" And insert —ON A SELECTED GRAPHICS OBJECT—; and Col. 4, line 22, please delete "projectlye" and insert —projective—;

Signed and Sealed this

Twenty-third Day of May, 1995

Attest:

BRUCE LEHMAN

*Attesting Officer*     *Commissioner of Patents and Trademarks*